United States Patent

[11] 3,603,422

| [72] | Inventor | Ettore Cordiano<br>Turin, Italy |
|---|---|---|
| [21] | Appl. No. | 787,009 |
| [22] | Filed | Dec. 26, 1968 |
| [45] | Patented | Sept. 7, 1971 |
| [73] | Assignee | FIAT Societa per Azioni<br>Turin, Italy |
| [32] | Priority | Jan. 26, 1968 |
| [33] | | Italy |
| [31] | | 50290-A/68 |

[54] INDEPENDENT DRIVEN WHEEL SUSPENSION
6 Claims, 4 Drawing Figs.

[52] U.S. Cl. ........................................ 180/73 TL,
267/11, 267/20
[51] Int. Cl. ....................................... B60g 3/14,
B60g 19/02
[50] Field of Search............................. 180/73, 73
TL

[56] References Cited
UNITED STATES PATENTS

| 3,193,042 | 7/1965 | Brewer.................... | 180/73 |
| 3,193,302 | 7/1965 | Hill......................... | 180/73 X |
| 3,202,237 | 8/1965 | Dreisziger ............... | 180/73 |
| 3,246,717 | 4/1966 | Dreisziger ............... | 180/73 |
| 3,417,835 | 12/1968 | Tenniswood............. | 180/73 |
| 3,422,918 | 1/1969 | Musser, Jr. et al........ | 130/73 |

*Primary Examiner*—A. Harry Levy
*Attorney*—Sughrue, Rothwell, Mion, Zinn & Macpeak ABSTRACT: An independent suspension for a driven wheel of a vehicle includes a trailing arm pivoted at one end to the wheel hub support and at the other end to the suspended body to transmit longitudinal (driving) stresses. The wheel is driven by a stub shaft which is connected to a differential via universal joints and which is effective to transmit transverse loads between the wheel hub support and the suspended body through the casing of the differential. A transverse link is pivoted between the wheel hub carrier and the body to prevent wobbling of the wheel.

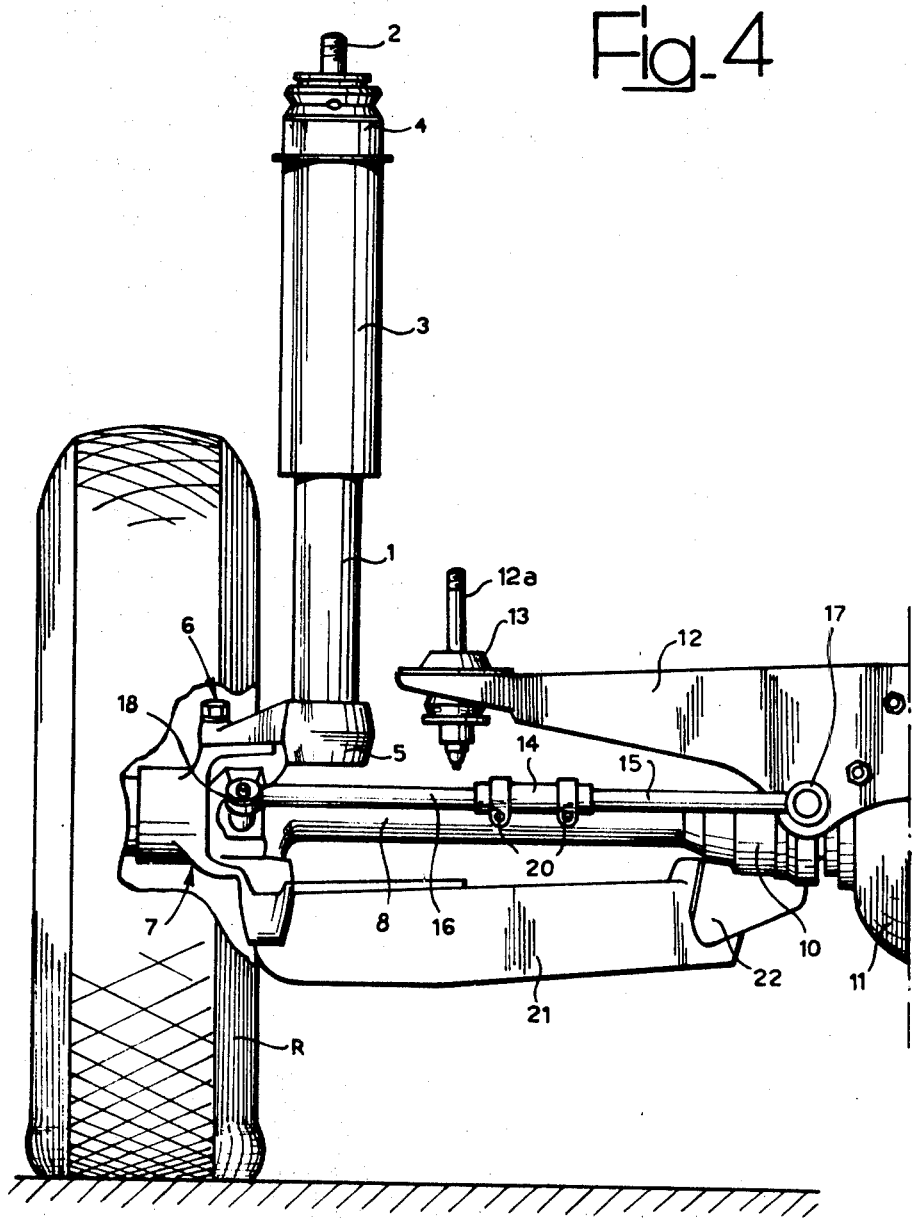

INDEPENDENT DRIVEN WHEEL SUSPENSION

This invention relates to suspensions for independent driven wheels, more particularly road wheels of motor vehicles.

A known form of suspension for front steerable wheels of motor vehicles includes, for each wheel, a support in which the wheel is rotatably mounted, the support being connected by an articulated joint to a transverse rocking arm articulated to the vehicle body. A telescopic shock absorber and at least one suspension spring are interposed between the rocking arm and the vehicle body.

This rather simple form of suspension is unsuitable for the rear wheels since it is incapable of preventing rotation of the support about a substantially vertical axis and displacements of the support lengthwise of the vehicle. In a known form of suspension for independent driven rear wheels of a motor vehicle each wheel is rotatably mounted at the end of a tubular sleeve enclosing a rockable stub axle shaft connected by a universal joint to a differential fixed to the suspended part of the vehicle, which may include the body portion of the vehicle and the chassis or frame, if one is used in the vehicle structure, the sleeve being rigid with the differential housing. A substantially longitudinally extending pivoted traction arm, a substantially vertical telescopic shock-absorbing leg, and a spring, usually a transverse leaf spring, may connect the said support to the suspended part of the vehicle.

In such suspensions transverse stresses to which the wheels may be subjected, especially when driving around bends, are transmitted by the sleeves of the stub shafts to the differential housing. Such suspensions are structurally of considerable weight and are expensive.

An object of the present invention is to provide an independent suspension for a driven wheel of a motor vehicle which avoids the disadvantages of known suspensions of the general type, and particularly, a suspension which is simple and yet strong, and is easy to fabricate and assemble. A further object of the invention is to provide such a suspension which is of light weight, satisfactory in operation, and of relatively simple and inexpensive construction.

Accordingly, the present invention provides a suspension for a driven wheel of a motor vehicle, characterized by the combination of a support for the rotatable hub of the wheel, a substantially vertical telescopic shock absorber leg and resilient suspension means interposed between said hub support and a suspended vehicle part, a traction arm articulated at its opposite ends to the hub support and said suspended vehicle part to transmit longitudinal stresses, a stub transmission shaft connected at its opposite ends by respective universal joints to the wheel hub and a differential respectively and adapted both to transmit driving torque and to act as substantially the sole means of transmitting transverse loads, and means for preventing rotation of the wheel about a substantially vertical axis.

According to the preferred embodiment of the invention, the said means for preventing rotation of the wheel about a substantially vertical axis comprise a transverse link secured at one end to the wheel hub support and at its other end to a member adapted to be secured to a suspended part of the vehicle.

Said transverse link is preferably adjustable in length to permit adjustment of the "toe-in" of the respective wheel.

The invention will be more clearly understood from the following description, given by way of example only, with reference to the accompanying drawings, wherein:

FIG. 4 is a rear elevational view of one of the suspensions of FIG. 2.

Figure 1:
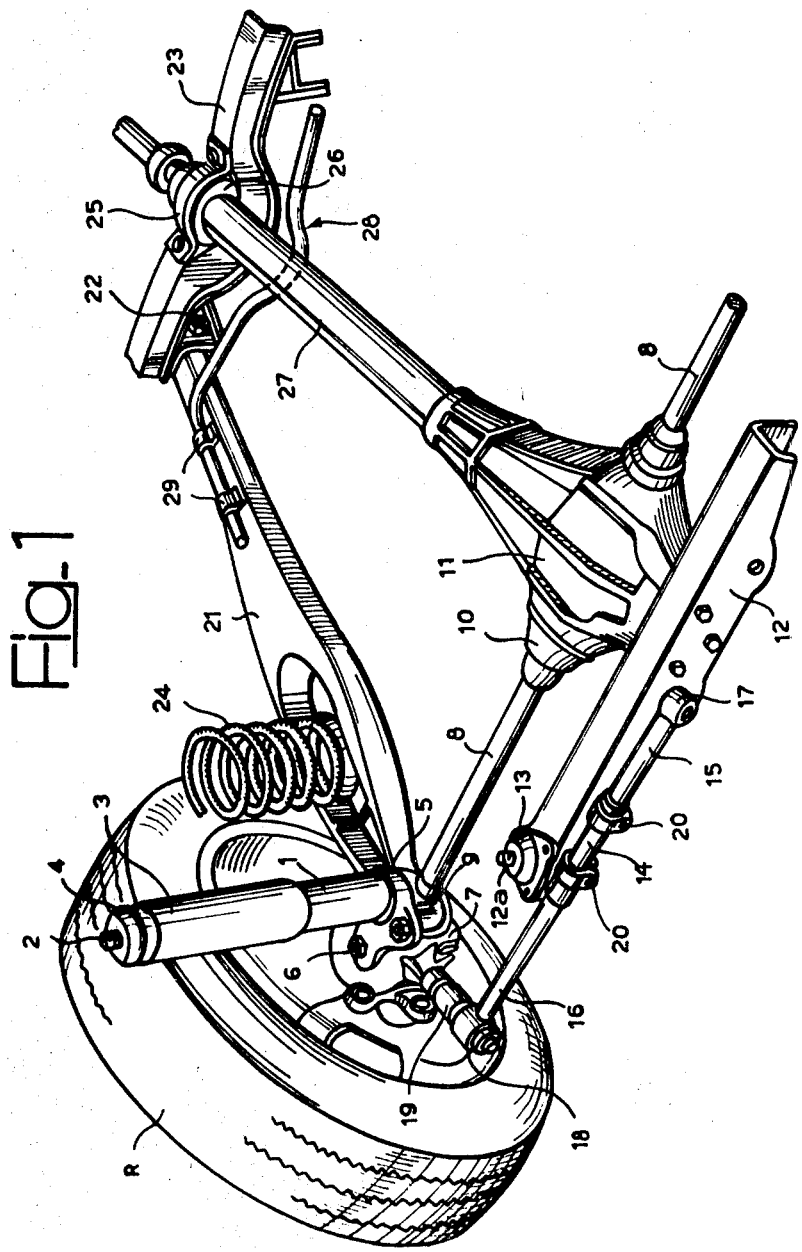
FIG. 1 is a perspective view of a suspension according to a preferred embodiment of the invention.
Figure 2:
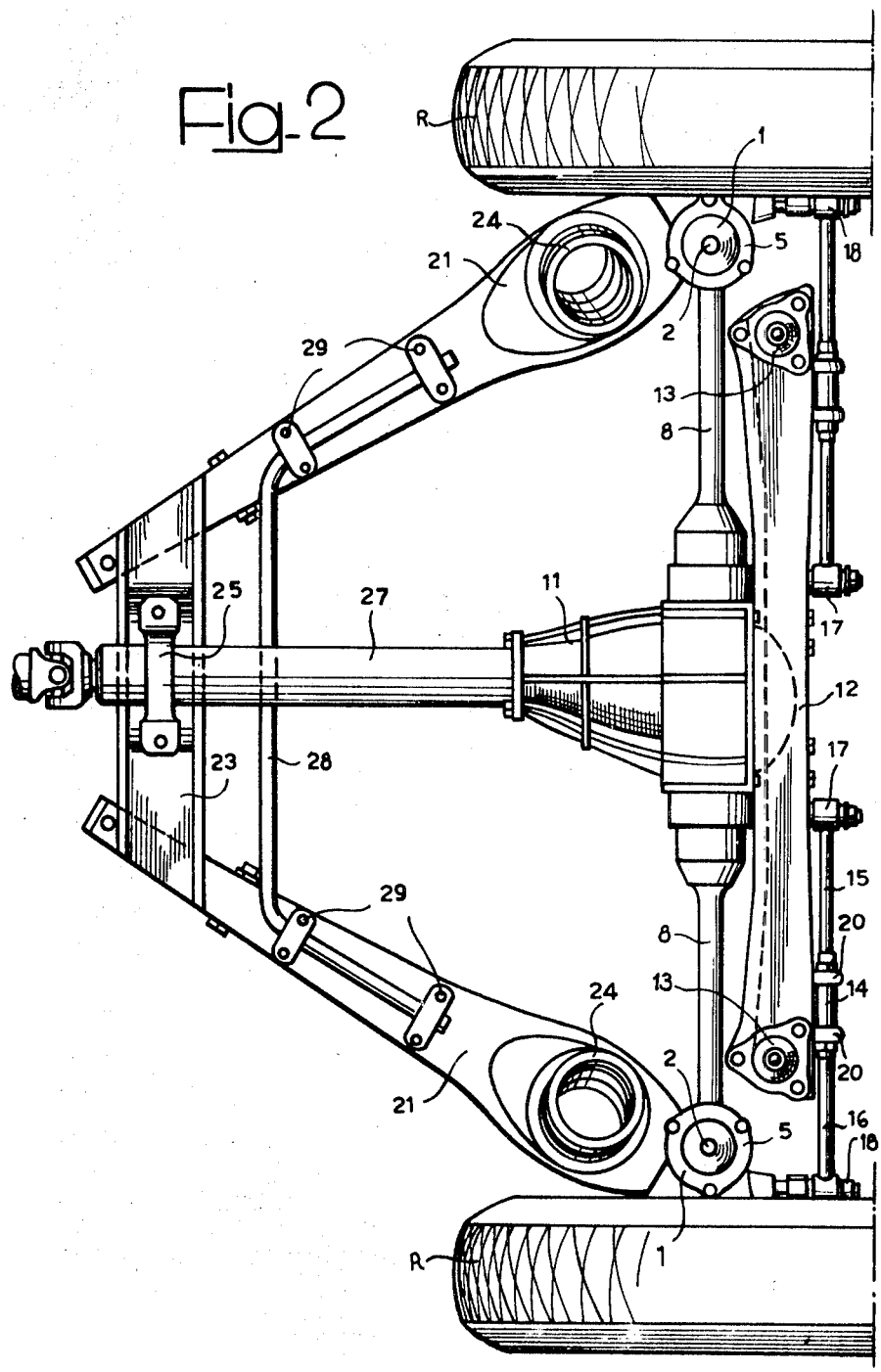
FIG. 2 is a plan view of two suspensions of the kind shown in FIG. 1, associated with a pair of driven rear wheels of a vehicle.

Referring to FIGS. 1 to 4, an independent suspension for each driven rear wheel of a vehicle includes a particularly sturdy hydraulic shock absorber cylinder 1 acting as a substantially vertical telescopic leg for the suspension and guiding the wheel on upward and downward movement relative to the vehicle body. The shock absorber has a movable rod 2 to which an external cylindrical protective sheath 3 is fixed, the rod 2 being attachable through the interposition of resilient rubber rings 4 to a vehicle body (not shown).

The cylinder 1 of the shock absorber is rigidly fixed at its bottom end in a seat in a plate 5 secured by bolts 6 to a hub support 7 in which the hub (not shown) of a vehicle rear wheel R is rotatably mounted.

A stub transmission shaft 8 of fixed length is connected by a universal joint 9, conveniently a cardan joint, the center of which is situated in a transverse plane containing the axis of the cylinder 1 and the wheel axis, to the hub of the respective wheel R, the joint 9 being rotatable relative to but prevented from axial movement in the support 7. At its inner end the stub shaft 8 is connected by a universal joint 10 to a differential enclosed in a casing 11. Any axial thrust exerted on the stub shaft 8 by the wheel R is transmitted by the joints 9, 10 to and is taken up by the differential casing 11.

A rear crossmember 12 of the suspended part of the vehicle, which may include the body or chassis, is secured transversely to the rear of the differential casing 11 and is resiliently connected to the suspended vehicle body by suitable means, for example, spaced bolts 12a, through the interposition of resilient pads 13.

Figure 3:
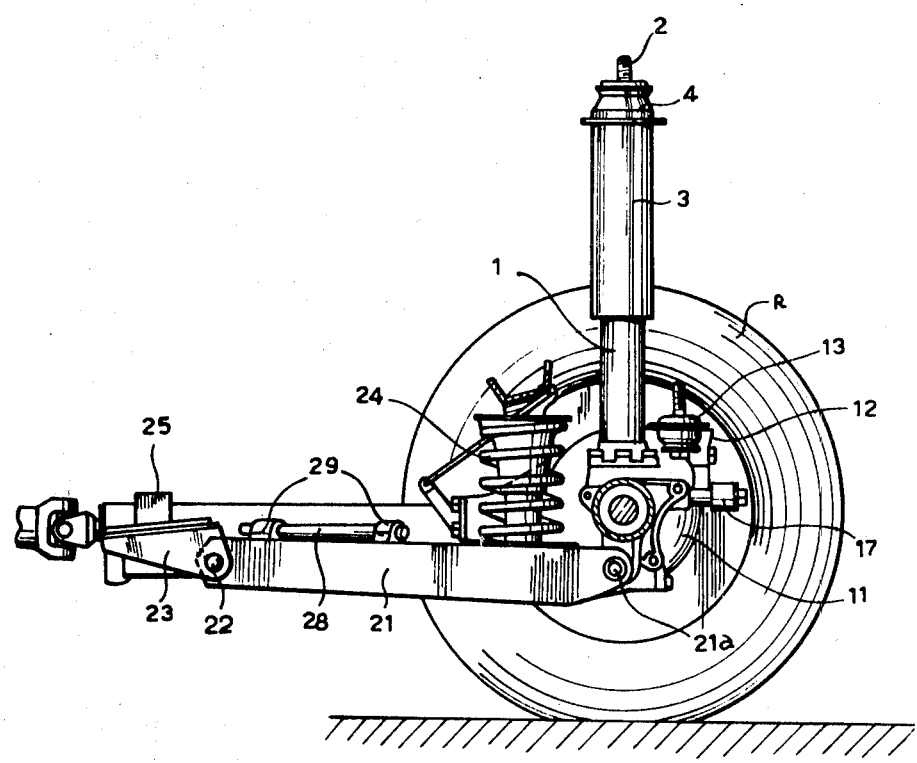
FIG. 3 is a side elevational view, partly in section, of one of the suspensions shown in FIG. 2.

Behind and parallel to the stub shaft 8 a transverse link is arranged which comprises an intermediate sleeve 14 and two end rods 15, 16 connected to the sleeve 14 by respective screw threads of opposite hand, so that screwing and unscrewing of the sleeve 14 result in shortening and lengthening of the link respectively. The rod 15 is secured to the rear crossmember 12 through a resilient bushing 17 and the rod 16 is secured through a resilient bushing 18 to a rearwardly extending arm 19 attached to the hub support 7. In addition to the transverse link 14, 15 and 16 being positioned behind and parallel to the stub shaft 8, the transverse link is also located at substantially the same vertical height as the stub shaft 8, as seen in FIGS. 3 and 4 of the drawings.

The stub shaft 8 besides transmitting torque to the wheel R, is the sole means of transmitting transverse stresses caused by transverse wheel loads, encountered, for example, when driving around bends. The link 14–15–16 takes up, together with the stub shaft 8, any torque tending to rotate the wheel R about a substantially vertical axis (that is, in a steering sense). Moreover, the link 14–15–16 affords a simple means of adjusting the toe-in of the respective rear wheel R, simply by unscrewing or screwing the intermediate sleeve 14. The sleeve 14 can be locked in its adjusted position by means of clamps 20.

Longitudinal acceleration and brake stresses are transmitted by a forwardly extending rigid trailing arm 21 of pressed sheet metal. The rear end of the arm 21 is articulated by a pivot 21a (FIG. 3) to the hub support 7, its forward end being articulated at a pivot 22 including a resilient bushing to a forward transverse crossmember 23 adapted to be secured to the suspended vehicle body, which may include the frame or chassis as pointed out above. The arm 21 is arranged obliquely to the longitudinal axis of the vehicle and is provided near the hub support 7 with a recess receiving the bottom end of a helical suspension spring 24 bearing at its top end on a suspended part of the vehicle body (not shown). The spring 24 provides independent resiliency for the suspension associated with the wheel R.

The forward crossmember 23 is shaped to provide a central recess in which a resilient bushing 26 enclosing a longitudinal stationary sleeve 27 is retained by means of a curved bridge piece 25. The sleeve 27 encloses a rotary drive transmission shaft connected to the differential in the casing 11.

The arms 21 of the two suspensions associated with the two driven rear wheels R (FIG. 2) are interconnected rearwardly of the pivots 22 by a stabilizer torque bar 28 of substantially U-shape bent at its middle portion to pass beneath the sleeve 27 and arranged with its opposite ends lying along and connected to the respective arms 21 by straps 29 the torque bar could, of course, be continuous with the arms 21. Resiliency is in such an arrangement conveniently afforded by a helical spring coaxially surrounding the top portion of the shock absorber and interposed between external annular flanges welded to the bottom of the shock absorber cylinder 1 and to the vehicle body portion overlying the latter.

It will be appreciated that many constructional details may be varied from the specifically described embodiment without departing from the scope of the invention as defined in the claims.

I claim:

1. In a vehicle having a suspended part and at least one rear wheel driven from a differential mounted to said vehicle, a suspension system for the wheel comprising in combination:
    a. a wheel hub support rotatably mounting said wheel,
    b. a rigid trailing arm extending between and articulated to said wheel hub support and to a single fixed point on said suspended part, said fixed point being located forwardly of the wheel, said trailing arm being adapted to take up longitudinal stresses,
    c. a vertically positioned shock absorber means having its lower end rigidly connected to said wheel hub support and its upper end connected to a point on said suspended part above the wheel, said shock absorber means being adapted to guide the wheel during upward and downward movement relative to said suspended part,
    d. spring means disposed between said suspended part and one of said trailing arm and wheel hub support,
    e. a stub shaft having a fixed length extending transversely between said differential and the wheel, said shaft having a universal joint attached to each end thereof, one of said universal joints being secured to said wheel and the other of said universal joints being drivingly connected to said differential, said stub shaft being adapted to transmit torque from the differential to the wheel and to transmit transverse loads from the wheel to said differential, and
    f. a transverse link extending between and articulated to a point on said wheel hub carrier rearwardly of said stub shaft and to a point on said suspended part, said transverse link being articulated to the suspended part for movement about a substantially horizontal longitudinal axis, said transverse link being positioned parallel to said stub shaft and located at substantially the same vertical level as said stub shaft, said link having a resilient bushing in at least one of its points of articulation, said transverse link adapted for securing and maintaining the static toe-in of said wheel at a predetermined value.

2. The suspension system of claim 1, wherein said transverse link is of an adjustable length to permit static toe-in adjustment of the wheel.

3. The suspension system of claim 1, wherein the suspended part includes a transversely extending crossmember connected forward of the wheel and having a resilient mounting located midway along its length for receiving a longitudinal stationary sleeve, said sleeve enclosing an input drive transmission shaft connected to said differential, said trailing arm being articulated at its forward end to said crossmember.

4. The suspension system of claim 1, further comprising, a casing for housing said differential, and said suspended part includes a crossmember extending transversely to and being resiliently connected to the vehicle at points spaced apart along the length of the crossmember, said casing being rigidly connected to said crossmember, whereby, transverse stresses are transmitted through the stub shaft to the casing.

5. The suspension system of claim 4, wherein the point of articulation of said transverse link having said resilient bushing therein is attached to said crossmember.

6. The suspension system of claim 1, further comprising, a second rear wheel and like suspension system therefor, both of said rear wheels being driven from said differential, and including a stabilizer torque member of substantially U-shaped construction extending between and connected with the trailing arms of each wheel suspension.